United States Patent [19]
Ritter

[11] 3,779,596
[45] Dec. 18, 1973

[54] MOBILE PASSENGER LOADING LOUNGE FOR AIRCRAFT

[75] Inventor: Henry Ritter, Nashville, Tenn.
[73] Assignee: Avco Corporation, Nashville, Tenn.
[22] Filed: July 28, 1972
[21] Appl. No.: 276,083

[52] U.S. Cl. ............ 296/28 AL, 182/115, 182/63, 296/35 A
[51] Int. Cl. .......................................... B62d 31/04
[58] Field of Search ............... 296/28 AL, 35 A; 182/115, 127, 63

[56] References Cited
UNITED STATES PATENTS
| | | |
|---|---|---|
| 841,108 | 1/1907 | Boyce ............................ 182/115 X |
| 1,862,632 | 6/1932 | Perin ................................ 296/35 A |
| 2,778,674 | 1/1957 | Attendo .......................... 296/28 AL |

FOREIGN PATENTS OR APPLICATIONS
| | | |
|---|---|---|
| 1,605,891 | 5/1970 | Germany ...................... 296/28 AL |
| 298,362 | 4/1954 | Switzerland .................... 296/28 AL |

Primary Examiner—David Schonberg
Assistant Examiner—John A. Pekar
Attorney—Charles M. Hogan et al.

[57] ABSTRACT

A lower self-propelled steerable passenger compartment releasably supports an upper passenger compartment on its roof. Both upper and lower passenger compartments have passenger stairs from their floors to their roofs. Extendible ramps at the level of the lower compartment roof and the upper compartment roof permit passengers who have ascended the stairs to be loaded from the compartments directly onto aircraft having loading doors at the level of either ramp. The upper passenger compartment may be loaded onto an aircraft as a module to completely eliminate intervehicle passenger transfer.

7 Claims, 3 Drawing Figures

PATENTED DEC 18 1973 3,779,596
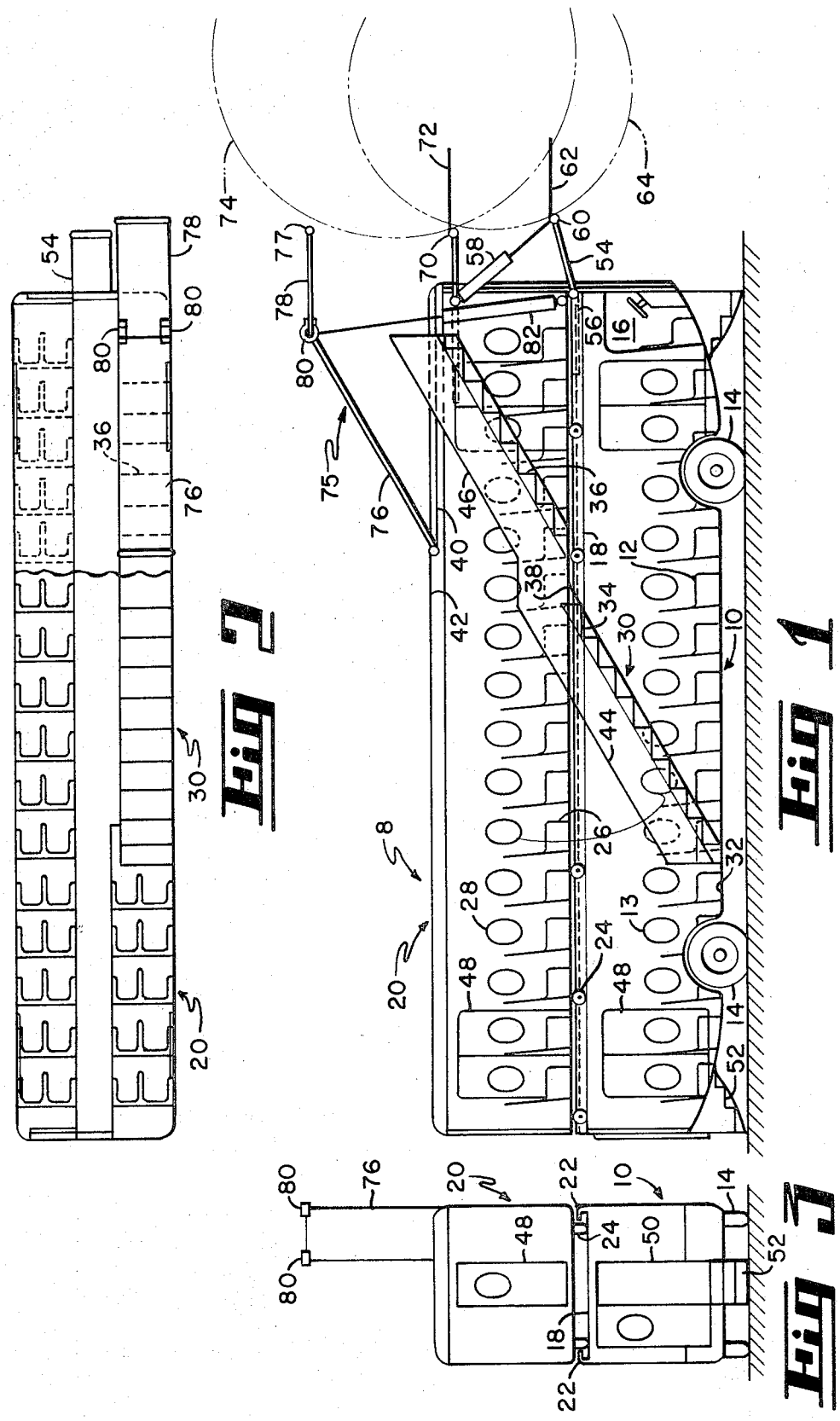

MOBILE PASSENGER LOADING LOUNGE FOR AIRCRAFT

The present invention relates to passenger loading aircraft and more particularly to passenger loading with mobile lounges.

The subject of how to quickly and efficiently load large numbers of passengers onto aircraft has received a great deal of attention in recent years. One of the approaches that has been put into use is the mobile passenger lounge. Briefly, it is a self-propelled steerable vehicle adapted to receive passengers at a central terminal loading area. The vehicle is driven to an aircraft which is parked adjacent a runway ready for take-off so that a great deal of time and money is saved due to the elimination of the complex movement of the aircraft from a passenger gate area. One example of this type of lounge is found in the mobile lounges used at Dulles International Airport, as reported in "Design of Passenger Terminals for American Airports," J. L. Hoban, Proceedings of the Institution of Civil Engineers, England, January 25, 1966, pp. 49–53. One of the problems with this type of lounge is that the ramps leading from the lounge to the aircraft have a limited degree of adjustment. With the advent of the wide-bodied air buses, such as the DC-10 and L-1011 and the 747, the height of the loading door from the ground has almost doubled relative to the current mid-size jet transport. One attempt to solve the problem of loading doors with diverse heights is in the mobile lounges currently used at New York's LaGuardia Airport and other major airports. This type of lounge has a motorized steerable undercarriage and a passenger compartment adjustably supported on hydraulic supports extending upward from the undercarriage. While this approach enables a variable in aircraft loading height that ranges between the loading height for the current and the air bus aircraft, it is extremely expensive and complex owing to the necessity of elevating the entire passenger compartment and controlling the vehicle by remote control.

Another problem with the above units is that they do not have the adaptability of being loaded onto an aircraft and as a module to completely eliminate inter-vehicle passenger transfer.

Accordingly, it is an object of the present invention to provide a mobile passenger loading lounge that is adapted to load passengers onto diverse aircraft having loading doors positioned at substantially different heights.

It is also an object of the present invention to provide a lounge of this type that is adaptable for loading onto an aircraft as a module.

In one aspect of the present invention the above ends are achieved by a mobile passenger loading lounge comprising a lower self-propelled steerable passenger compartment and an upper passenger compartment releasably connected to the roof of the lower passenger compartment. Each compartment has a set of stairs extending from its floor to its roof. First and second adjustable and extendible ramps are provided on the same level as the upper ends of both sets of passenger stairs and at one end of the lounge for connecting with the door of an aircraft to be loaded with passengers from the lounge.

In another aspect of the present invention the upper lounge is adapted to be loaded onto an aircraft as a module.

The above and other related objects and features of the present invention will be apparent from a reading of the description of the disclosure shown in the accompanying drawing and the novelty thereof pointed out in the appended claims.

In the drawing:

FIG. 1 shows an elevational view of the mobile aircraft loading passenger lounge embodying the present invention;

FIG. 2 is a plan view of the lounge of FIG. 1; and

FIG. 3 is an end view of the lounge of FIG. 1.

Referring now to FIG. 1, there is shown a mobile passenger loading lounge 8 comprising a lower passenger compartment 10 fitted with passenger seats 12 and windows 13 and having ground drive wheels 14. Ground drive wheels 14 are suitably powered and steered from an operator station 16 to make the lower compartment 10 self-propelled and steerable. Passenger compartment 10 has a roof 18 of sufficient strength to support an upper passenger compartment 20 that is supported in tracks 22 on roof 18 by a series of wheels 24. Suitable detachable connections (not shown) lock the upper passenger compartment 20 in place on the roof of passenger compartment 10 so that it may be removed in a horizontal direction by rolling on the wheels 24. Upper passenger compartment 20 also has passenger seats 26 and windows 28.

Lower passenger compartment 10 has a set of stairs 30 extending from its floor 32 to an opening 34 in its roof 18. A suitable cover (not shown) is placed over opening 34 when the upper compartment 20 is detached. This set of stairs is generally in line with another set of stairs 36 extending from the floor 38 of the upper compartment to an opening 40 in its roof 42. Both sets of stairs 30 and 36 have suitable collapsible railings 44 and 46, respectively.

Entrance to the mobile lounge may be accomplished by doors 48 in both the upper and lower compartments or by end doors 50 in the lower compartment 10 which have a built-in step 52 to ground level.

Located in the floor 38 of upper lounge 20 is a first retractable ramp 54 (shown in its extended position). Ramp 54 is stowed in a suitable recess 56 when not in use and extended or retracted by a suitable actuating system (not shown). An actuator 58 connected to the end of ramp 54 and to the upper compartment 20 permits the free end 60 to be adjusted to the loading door 62 of a current aircraft, typically illustrated by phantom lines 64.

A second ramp 66 is retractable and extendible from a recess 68 adjacent the roof 42 of upper passenger compartment 20. Ramp 66 is manipulated by a suitable actuating device and can have a limited adjustment to maintain the free end 70 at the height of the loading door 72 of a large jet transport aircraft 74 having a loading height substantially different from that for the current jet transport 64.

A canopy 75 comprising first and second hinged sections 76 and 78 is pivotally connected to the end of opening 40 by hinge 79. In the extended illustrated position the element 76 is pivoted to the elevated position shown in FIG. 1 and element 78 is pivoted approximately to a horizontal position where its free end 77 abuts aircraft 74 so that canopy 75 protects the ramp 66 from the elements. In the retracted position the element 78 is pivoted to a position flush with element 76 by a suitable rotary actuator 80 and then the element 76 is pivoted onto the roof 42 of upper passenger compartment 20 by an actuator assembly 82 to cover opening 40.

In operation, passengers are loaded onto the mobile lounge through any of the doors at a central terminal area. When the passengers are loaded onto the lounge the lounge is driven out to an aircraft waiting in a taxi area. If the jet aircraft is a current type, as illustrated by aircraft 64, passengers ascent stairs 30 from the lower compartment 10 and walk at the same level from the upper compartment 20 to the ramp 54 which is in alignment with door 62 of aircraft 64. If the aircraft is of the large jet variety, as exemplified by aircraft 74, the passengers ascend stairs 30 and 36 to reach the level of ramp 66 which is in alignment with door 72 of aircraft 74. When this ramp is in use the canopy is in its extended position to protect the passengers from the elements and also to permit the passengers access to ramp 66 through the roof of upper compartment 20.

The upper compartment 20 may be loaded with passengers and driven by the lower vehicle to an aircraft which is adapted to directly receive the upper compartment as a module, thus completely eliminating the necessity for passengers transfer. The aircraft is flow to another city where a similar lower compartment receives the upper compartment and transports it to an unloading area.

It can be seen that the mobile lounge described above provides the capability of loading passengers onto aircraft having widely different loading heights without the need for complex passenger compartment elevating devices. In addition, the lounge offers the capability of loading the upper compartment directly into an aircraft to completely eliminate inter-vehicle passenger transfer.

While the preferred embodiment of the present invention has been described, it should be apparent to those skilled in the art that it may be modified without departing from its spirit and scope.

Having described the invention, what is claimed as novel and desired to be secured by Letters Patent of the United States is:

1. A mobile lounge for loading passengers onto an aircraft, said lounge comprising:
    a lower self-propelled steerable passenger compartment having a roof and floor;
    an upper passenger compartment releasably connected to the roof of said lower passenger compartment, said upper passenger compartment also having a roof and floor;
    first and second sets of passenger stairs extending from the floors to the roofs of said lower and upper compartments, respectively;
    first and second adjustable extendible ramp means on the same level as the upper ends of said first and second passenger stairs, respectively, and at one end of said lounge for connecting with the floor of an aircraft to be loaded with passengers from said lounge; and
    the roof of said lower compartment and the floor of said upper compartment having openings permitting access to said upper compartment through said first set of passenger stairs, said upper compartment having an opening permitting access to said second adjustable ramp means.

2. A mobile lounge as in claim 1 wherein said first ramp means has a free end adjustable relative to the ground to permit a limited variation in loading height for said first ramp means.

3. A mobile lounge as in claim 2 wherein:
    said first ramp means comprises a ramp stowable in a recess in the floor of said second passenger compartment and extendible therefrom to permit passenger loading onto an aircraft; and
    said passenger lounge further comprises an actuator pivotally connected to the free end of said first ramp and to said lounge to permit said adjustment of the free end of said ramp.

4. A mobile lounge as in claim 1 wherein:
    said second ramp means is stowable in a recess in the roof of said upper passenger compartment; and
    said lounge further comprises an elevatable canopy permitting access to said second ramp means from the second set of passenger stairs through the roof of said upper passenger compartment.

5. A mobile lounge as in claim 4 wherein said canopy comprises first and second pivotally connected sections, the first of which is pivotally connected over an opening in the roof of said upper passenger compartment, said first section being pivotal from an elevated extended position to a stowed position where it closes off said opening, said second section being pivotal from a stowed position where it is flush with said first section to an extended position where it abuts against the side of an aircraft to form a protective cover for passengers using said second ramp means.

6. A mobile lounge as in claim 5 further comprising:
    a linear actuator connected to the pivotal connection between said first and second roof sections and to said lounge to displace said first section between said extended and stowed positions; and
    a rotary actuator connected at the pivotal connection between said first and second roof sections for pivoting said second roof section between said extended and stowed positions.

7. A mobile lounge as in claim 1 further comprising:
    a series of wheel elements for supporting said upper compartment on the roof of said lower compartment;
    a pair of rails on the roof of forming guides for said upper passenger compartments whereby said upper passenger compartment may be easily loaded as a unit from said lower compartment to an aircraft or other transport device.

* * * * *